UNITED STATES PATENT OFFICE.

CARLETON ELLIS, OF MONTCLAIR, NEW JERSEY, AND MORTIMER J. COHEN, OF NEW YORK, N. Y., ASSIGNORS, BY MESNE ASSIGNMENTS, TO SETH B. HUNT, TRUSTEE, OF MOUNT KISCO, NEW YORK.

DIRECT PRODUCTION OF ESTER BODIES FROM UNSATURATED HYDROCARBONS.

1,365,050.     Specification of Letters Patent.     Patented Jan. 11, 1921.

No Drawing.     Application filed June 25, 1917. Serial No. 176,669.

*To all whom it may concern:*

Be it known that we, CARLETON ELLIS and MORTIMER J. COHEN, citizens of the United States, and residents of Montclair, county of Essex, and State of New Jersey, and New York, county of New York, and State of New York, respectively, have invented certain new and useful Improvements in Direct Production of Ester Bodies from Unsaturated Hydrocarbons, of which the following is a specification.

The object of the invention is what we may term the direct production of ester bodies, as the acetic esters, from unsaturated materials. We shall refer to such unsaturated material as olefins, but the term is used to embrace all forms of unsaturated hydrocarbons or similar unsaturated material reacting in the general manner herein described.

According to the present invention olefins, whether in substantially the pure form or present in olefin containing materials, as cracked oils, including cracked petroleum oils, are converted into ester bodies without carrying out separate steps of first producing and isolating alcoholic bodies and thereafter esterifying such alcoholic bodies to esters.

For the purpose of affording a clear understanding of our invention, but without imposing limitation thereon, it is herein described with more particular reference to the treatment of the olefins present in cracked petroleum oils, which comprise saturated hydrocarbon material and a mixture of various unsaturated materials.

The olefins of cracked oils, as petroleum oils, which may be in the gaseous or vaporous or liquid state, are treated with a reactive acid, preferably an oxygen containing mineral acid, as sulfuric acid, for the extraction, absorption or solution of the olefins under conditions whereby the formation of tarry and resinous material and similar products and sludges and undesirable polymerization and carbonizing is preferably substantially avoided.

While we shall herein refer more especially to the use of sulfuric acid, it is to be understood that we are not thereby to be limited to the use of dibasic acids of this special type, but other suitably reactive acids of this general character may be utilized. In addition to ordinary sulfuric acid, oleum or pyrosulfuric acid may be used in some cases.

In the case of procedure with sulfuric acid, the treatment of the cracked olefin containing materials is preferably carried on under sulfating conditions, by which expression, "sulfating conditions," as used herein, we mean conditions whereby the action of the sulfuric acid upon the olefin material is substantially directed to the production of sulfated materials or to the absorption or solution of the olefins in the sulfuric acid, and whereby the formation of tarry and resinous sulfonated material and similar products and sledges is preferably largely or entirely avoided, as is also the undesirable polymerization of the material under treatment. The solution, extraction or sulfated material may be separated from the saturated bodies when present as, for example, where the cracked oils are in liquid form, by withdrawing the acid extract, which forms a layer under the saturated material, (with some saturated material usually present therewith) by a valve from beneath or by siphoning off or otherwise. We shall refer to the material thus obtained, and comprising olefins and sulfuric acid, as the acid liquor. The substantial immiscibility of the acid liquor in the saturated materials is of particular advantage when dealing with hydrocarbon material containing only small proportions of olefins, enabling separation to be readily and simply performed.

This acid liquor obtained from the olefin containing bodies is in the nature of an intermediate material, that is to say, preferably substantially immediately after being obtained it is subjected to further treatment, and preferably the action of the sulfuric acid on the olefins treated is so carried out that the action is directed to the production of suitably reactive materials, avoiding, so far as possible, the formation of waste, sulfonated, tarry, resinous and charred sludges and undesirable polymerized bodies and the like, such as are produced, for example, in refining cracked gasolene by the ordinary sulfuric acid sludge treatment.

This acid liquor upon being obtained, as by separation from the saturated components of the olefin containing bodies, as cracked petroleum, is preferably subjected substantially immediately to treatment for preventing undesirable reactions between the acid and the olefins, as by diluting the acid extract or subjecting it to treatment for producing ester bodies, or both, or to still other modes which have the result, among other things, of preventing reaction productive of undesirable bodies. With highly sensitive olefins, preferably no substantial time interval is permitted to elapse between the securing of the acid liquor and its dilution or treatment to produce ester bodies, or both, as if with such sensitive olefins or under these conditions such substantial interval of time is permitted to elapse, the beneficial effect of carrying on the reaction under sulfating conditions may be lost.

The acid liquor is preferably so produced as that if an excess of sulfuric acid is present, such excess is reduced to the lowest practicable point, that is to say, in such manner as that substantially a maximum quantity of the olefins are taken up by the acid. However, in certain cases, as is hereinafter explained, it may be desirable to have a fairly considerable excess of the acid. As, for example, this may be desirable in order that the contents of the still used in producing the esters may be in fluid condition, which facilitates the handling thereof and the cleaning of the still, and where other organic salts than calcium acetate are used in the production of ester bodies as hereinafter described, as, for example, sodium acetate.

For the production of the acid liquor, the gases from petroleum stills, together with vapors carried thereby, may be passed through a tower with sulfuric acid of 1.8 specific gravity or other acid of suitable strength, including 1.84 sulfuric acid and sulfuric acid of 96%, 98%, 100% and 105%, or higher, trickling therethrough over suitable refractory materials passing in the opposite direction, and preferably this counter current interreaction may be carried on under super-atmospheric pressure, the power of the sulfuric acid for taking up the vaporous and gaseous olefins being greater with the increased pressure. Or the gaseous materials just referred to may be compressed and liquid material produced therefrom, or other olefin containing liquid or cracked oils may be extracted with sulfuric acid, the acid being preferably added gradually and the material preferably kept under agitation and preferably cool while the reaction is carried out, or the acid liquor may be produced by the successive treatment of olefin containing liquid material, as cracked petroleum oils, with sulfuric acid of gradually increasing strengths. Or the acid liquor obtained by extracting an olefin containing material with sulfuric acid may be utilized to extract olefins from fresh olefin containing material, or fresh sulfuric acid may be utilized to extract olefins from the residue remaining after the previous extraction with sulfuric acid and withdrawal of the acid liquor so produced.

However the acid liquor is formed, it is an economy and preferably a desideratum to obtain alkyl hydrogen sulfate in which substantially the maximum possible quantity of olefins are taken up by or combined with the sulfuric acid. The extent to which this is accomplished may be easily determined by noting the reduction of specific gravity of the acid extract, it being possible by proper control of the conditions of extraction to obtain a reduction of the specific gravity of the acid, as more olefins are extracted from 1.8 to 1.3 or as low as 1.2, or even lower. After acid liquor is obtained, preferably containing olefins in the highest proportion obtainable from materials, as cracked oils, containing olefins, pure or substantially pure olefin material may be added to the extract, or vice versa, thereby obtaining substantially complete charging of the acid with extracted olefins, or the acid liquor may be formed by mixing substantially pure olefins with sulfuric acid of suitable strength, and still other ways of producing the acid liquor may be resorted to, sulfating conditions being preferably maintained to the requisite degree during extraction of the olefins.

We have found that good results are obtained in subsequent treatment of the acid liquor to produce ester bodies when the acid liquor is diluted with water. The quantity of water used may vary within fairly wide limits, but, for example, when acid of 1.8 specific gravity is used for the formation of the acid liquor from hydrocarbon material obtained by compressing the still gases of petroleum, water to about one-third or one-fourth or one-fifth of the amount of sulfuric acid used in forming the acid liquor may be added. The addition of this water, which is preferably, though not necessarily cool, reduces concentration of the excess sulfuric acid which may be present and serves to prevent undesirable reactions between some olefins and the sulfuric acid, and also serves to assist in the production of ester bodies in a satisfactorily uniform manner and to prevent carbonizing action during the production of the ester bodies.

The acid liquor, preferably diluted, is incorporated with or added to a salt of an organic acid, as calcium acetate, or vice versa. In addition to acetates, other salts of organic acids may be used, and salts of other organic acids, including salts of lower fatty acids, aromatic acids or of any other acid suitable for this purpose, or mixtures of salts with other salts, and of salts with their acids, or the organic acids or mixtures thereof may be used. For example, when the acetic ester is to be produced, the acid liquor, preferably diluted with a diluent, as water, may be added to or there may be added to it a suitable quantity of calcium acetate. The admixture of the acid liquor with the calcium acetate is preferably carried out comparatively slowly and with agitation, and if undue heat is developed, cooling may be resorted to during the time that the admixture is being carried out, or the heat may be made use of in the reaction. The materials are preferably mixed in a still which is connected up with a condenser, so that any gaseous or vaporous products produced during mixing may be condensed and saved, and after the materials have been thoroughly mixed together they are preferably permitted to stand for some time, say five or six hours or over night for digestion, with or without agitation, and if agitation is carried on during the period of such digestive action, such agitation is preferably of a comparatively slow and gentle character for the purpose of permitting the digestion to take place substantially uniformly throughout the entire mass. This digestive treatment may be dispensed with, if desired, but when practised it appears to facilitate the subsequent distillation and apparently better yields can be obtained. The digestive action is preferably carried on in the still to save any condensate.

These materials, preferably when sufficiently mingled together and preferably digested for a period of time, are distilled in any suitable manner and the distillate collected. The distillation may be carried on in any desired way, as, for example, by the application of external heat or by the introduction of steam, which may be wet steam highly charged with water vapor or dry super-heated steam, and in the case of distilling with steam, substantial quantities of water are thereby introduced into the material being distilled while distillation is going on. Also water may be introduced in liquid form into the still as the distillation proceeds and preferably at about the rate of distillation of water from the still so as to keep the liquid level in the still substantially uniform and to prevent concentration of any excess sulfuric acid present, and to prevent decomposition, which may result from such concentration of acid, or the distillation may be carried on without the addition of water, but in such case the residue in the still may become caked or solidified, and the addition of water is preferable in order to avoid such condition and the other features noted above. The still is preferably provided with an agitating device so as to avoid pocketing and to keep the action uniform and to prevent the caking and hardening of materials within the still, the same device preferably serving for admixture of the materials and to assist in digestive action. The presence of an excess of sulfuric acid in the acid liquor or alkyl hydrogen sulfate is helpful toward keeping the contents of the still always in liquid condition, and the acid, therefore, if preferred, may be present in such excess, though ordinarily this is not desirable.

The material distilled over divides itself more or less into layers, an oily material collecting at the top, and, in the case of calcium acetate being used, aqueous material carrying more or less acetic acid collecting beneath the oil. In this oily material, in the case of the reagents above referred to, is comprised a mixture of esters corresponding substantially to the reactive mixed olefins present in the olefin containing material, as ethyl, propyl, butyl, amyl, hexyl, heptyl, etc., acetates. Mixed esters may be obtained with the use of mixed organic acids or salts thereof. In some cases, as, for example, with compressor gas liquor comprising unsaturated material, although the boiling points of some of the acetates produced are well above 100° C., where water is present, they appear to be carried over with the water vapor, and the greater part thereof is carried over without the vapor temperature rising substantially above 100° C. to 105° C.

The two layers may readily be roughly separated, as by drawing off the water or weak acetic acid from beneath the esters, and closer separation may be obtained by salting out, fractional distillation or other means, as will readily be understood.

In the still there is formed a sulfate from the base of the organic salt as, in the illustrative case referred to, calcium sulfate. Where calcium sulfate and sulfuric acid are present in substantial excess, alkalis, or alkaline earths, as, for example, lime, may be used to neutralize the acetic acid formed, the use of lime producing calcium acetate which may be recovered and reused with subsequent batches in the treatment for production of ester bodies. Mixtures of the acid and acetate may be neutralized with soda ash to produce acetate of soda which, at the same time, to a considerable extent salts out esters dissolved in the weak acetic solution. Still other alkalis may be used, or the acetic acid may be separately recovered and disposed of.

Whether the reaction of the organic acid takes place directly with the olefin material or whether there is some transfer of water to the olefin material in the sulfuric acid vehicle before or during the process of forming the ester, is perhaps difficult to state. In any event the result obtained is the union of the organic acid with the olefin material and with the same effect and product as if alcoholic material was produced and the organic acid permitted to react upon the alcoholic material.

With high yields of the ester bodies, as acetates, the oily distillate yields litttle or no unsaturated hydrocarbon material or olefins, but under circumstances less favorable for the formation of ester bodies a greater or less quantity of olefins is obtained and which are presumably a portion of the olefins taken up by the sulfuric acid and unchanged or else are regenerated olefins formed in the course of the reactions. Such olefin material, when present, may be separated from the esters by usual methods of rectification and distillation and may be utilized in any desired way, as, for example, in the formation of new acid liquor.

In the production of ester bodies of this general character it is important, in order to secure a substantial yield, that the proportions of the reacting constituents be regulated so that the conditions will be adjusted to give the best results. For example, in the production of the acetic ester or esters from the olefin material, the reacting elements may be considered to be the olefins or the olefins in solution or combination in or with the sulfuric acid, calcium acetate or sodium acetate or other salt of acetic acid and, in some cases, water. Dilution of the sulfuric acid or of the alkyl hydrogen sulfate (acid liquor) by the addition of water should preferably not be carried so far as to sacrifice the requisite dehydrating effect resulting from the presence of fairly strong sulfuric acid. Too great dilution may be brought about, for example, by addition of too much water or by the presence of too great a quantity of calcium acetate, as the latter by reacting with the sulfuric acid to form calcium sulfate removes free acid from the field of the reaction and the residual acid may thereby be too greatly diluted with the water which is present to afford the best possible conditions.

It may be stated that in one case the yield of the ester bodies was reduced to about one-quarter of the amount normally obtained, merely by increasing the calcium acetate by an amount between 10% and 20%, and without any other substantial change of conditions beyond the addition of such increased quantity of calcium acetate. Accordingly the proportion of the calcium acetate, sulfuric acid and water when used should be adjusted with these points in view. In the examples which are given herein a considerable variation of proportions has been indicated, and yields have been obtained which serve to illustrate the points enumerated.

Without expressing any theory as to the mechanism of reaction, what appears to be the result of the ester producing reaction may be expressed according to the following equation, which is given simply to express, in a general way, the result of the reaction without limiting us to any particular reaction mechanism and without excluding intermediate reactions, and without limitation of the expression "acid liquor" as the same is used herein:

$$RCH=CH_2 + H_2SO_4 \rightarrow$$
$$RCH_2CH_2HSO_4 + Ca(C_2H_3O_2)_2 \rightarrow$$
$$RCH_2CH_2(CH_3COO)$$

Of course, when sulfuric acid is present in excess, acetic acid is formed, but, as already stated, the excess of sulfuric acid and the consequent production of acetic acid is preferably reduced to the minimum. The distillation may be advantageously carried out under ordinary atmospheric pressure, and distillation at greater than substantially atmospheric pressure is preferably avoided.

Where the olefins treated are comprised in mixtures of saturated and unsaturated material and separation from the saturated material is not desired, the acid liquor need not be withdrawn from the saturated material of the cracked oil or other olefin containing material. For example, vehicles for bronzes and lacquers, &c., may contain as much as 50% or more gasolene, and in the production of these and similar products, the saturated materials present, or part thereof, may be permitted to remain throughout the various operations.

The following are examples which give an understanding of modes in which the invention may be practised, but it is to be understood that the same are presented only for affording a clear understanding of the invention and that we are not to be limited thereto except as is required by our claims.

*Example 1.*

Alkyl hydrogen sulfate (acid liquor) containing 224 parts by weight of 1.8 sulfuric acid, and 100 parts by weight of olefins was obtained by extraction of olefins with the sulfuric acid from olefin containing material consisting of the liquid obtained by compressing and condensing vapors from petroleum stills. To extract the unsaturated hydrocarbons from this liquid, the acid was entered into the oil slowly and with agitation and cooling, which were continued for a time after the acid had been added, and after standing for a further time the acid extract was withdrawn from beneath the saturated material, the acid having gained 100 parts by weight during the extractive action. To this acid extract or liquor, which was of substantially 1.25 specific gravity, was added 54.5 parts by weight of water, and to the acid liquor so diluted 246 parts by weight of gray commercial calcium acetate were gradually added with a consequent rise in temperature, a still equipped with an agitator being made use of, which was operated while the mixing was going on. This mixture was digested by letting it stand for a period of about twelve hours and it was then distilled, being agitated with a rotary stirring during distillation, yielding a distillate comprising a layer of oily material and a layer of weak acetic acid. During the distillation water was added to the still at substantially the rate that the still contents distilled over. The distillate consisted approximately of 165 parts of the oily material and about an equal weight of weak acetic acid. Sodium carbonate was then added to the distillate until it was neutral. The oil was separated from the solution of sodium acetate formed and the oil was equal to about 134 parts by weight, having a saponification number of 326 and a gravity of .845 and consisting of about 75% or about 100.5 parts of mixed acetates calculated as amyl acetate.

*Example 2.*

Another mixture of alkyl hydrogen sulfates (acid liquor) containing 100 parts of olefins and 423 parts of 1.8 sulfuric acid was obtained by using alkyl hydrogen sulfate, to extract fresh compressor gas liquid, the conditions of the second extraction being substantially the same as in the extraction of Example 1. The alkyl hydrogen sulfate so obtained was of substantially 1.35 specific gravity and was diluted with 105 parts of water. 418 parts of calcium acetate was added to this mixture slowly and with continuous agitation, the still in which it was added being kept cool. This was permitted to digest by standing over night and then distilled. The distillate was mixed with sodium carbonate and produced 101 parts of crude acetates, and 82 parts of pure acetates were obtained on redistillation. In this case no water was added while the distillation was going on.

*Example 3.*

Acid liquor containing 100 parts of olefins of liquefied still vapors of petroleum and 245 parts of 1.8 $H_2SO_4$ was diluted with 60 parts of water. 275 parts of commercial gray acetate of lime was added while stirring to the acid extract and after standing over night digesting the mixture was distilled. The combined weak acid and oil distillate was neutralized with $Na_2CO_3$ and the acetates were separated from the solution of sodium acetate. 154 parts of crude acetates were recovered, of .840 specific gravity, having a saponification number of 302 and consisting of 70% or 107.8 parts of pure acetates calculated as amyl acetate.

The present invention presents numerous features of advantage, among which are the following:

The acid liquor is insoluble in the saturated material and very quickly separates, collecting as a heavy layer below the lighter saturated material. Thus saturated material may be practically completely eliminated with readiness. The immiscibility of the acid liquor with the saturated gasolene is of the greatest advantage in the present process, especially when dealing with hydrocarbons containing only small proportions of olefins. Reaction on the olefins with a reagent producing derivatives which would be miscible in the saturated hydrocarbons, would offer difficulties in subsequent operations which do not obtain with the acid liquor referred to. A chemical reaction may take place between the acid and the olefins forming a composite organic-inorganic acid, which may be regarded as alkyl sulfuric acid or acid alkyl sulfate, or even from one point of view may be considered as an inorganic acid ester of the hydrocarbon radical, or it may be a solution or absorption of the unsaturated bodies in the sulfuric acid which takes place, or a combination of these, involving both chemical reaction and physical absorption or solution. In any event the sulfuric acid takes up the olefin or other unsaturated material producing an acid liquor which has the very desirable property of being substantially immiscible with saturated petroleum hydrocarbons so that separation therefrom is obtained by the simple procedure of settling.

The whole operation is simple and readily performed. The materials used are readily available. It is not necessary to work under high pressure. The whole operation can be carried out at around atmospheric pressures. No elaborate or expensive apparatus is required, simple vessels being all that is necessary, resulting in great economy of equipment and simplicity of operation, and elimination of many difficulties of operation which might be encountered in working at high pressures with such inflammable material.

Sulfuric acid is substantially used up in the reaction and the expense and trouble of storing, shipping or reclaiming substantial quantities of dilute sulfuric acid is avoided.

Sulfuric acid being dibasic acid reacts with olefins normally to form acid compounds as noted so that the product obtained by extraction is normally of an acid character, and when the sulfuric acid has taken up substantially its equivalent of olefin material, under normal conditions it appears probable that this acid character enables reaction with a salt of an organic acid, such as calcium acetate, to take place under highly favorable conditions, probably utilizing to the highest degree the characteristic of nascency involved in the reaction causing the formation of the esters.

The acid liquor heretofore referred to, obtained by treating unsaturated material with a mineral acid as sulfuric acid, from one point of view, as already stated, may be considered as a mineral acid ester or a solution of such ester or esters in an excess of the mineral acid according to the proportion of mineral acid employed, whereas the bodies obtained by acting on the acid liquor with organic material, as a salt of an organic acid, are organic acid esters or mixtures thereof. Where the term ester is used without qualification we refer to its commonly accepted meaning of a product such as may be produced by union of an organic acid with an alcohol.

Modifications and changes may be resorted to within the scope of our claims. For example, other acids and mixtures may be used. Sulfuric acid has been described as the preferred acid. While it is best used in about the strengths stated, other acids may be mixed with it more or less to somewhat modify its activities, and such acids, as nitric acids, hydrochloric acid, phosphoric acid, acetic acid and the like may be added to greater or less extent. However, reaction is best carried out with sulfuric acid, ordinary commercial sulfuric acid forming a sulfated product or acid liquor giving very satisfactory results. Some other modifications have already been referred to. Still other modifications and changes may be resorted to within the scope of our claims.

Having thus described our invention, we claim:

1. The process of making esters which consists in reacting on olefins with sulfuric acid, and reacting on the combination so produced with an agent adapted for replacing the sulfuric acid radical with an organic acid radical.

2. The process of making acetates which consists in reacting on olefins with sulfuric acid, and reacting on the combination so produced with an agent adapted for replacing the sulfuric acid radical with the acetic acid radical.

3. The process of making esters having more than two carbon atoms which consists in reacting on olefins having more than two carbon atoms with sulfuric acid, and reacting on the combination so produced with an agent adapted for replacing the sulfuric acid radical with an organic acid radical.

4. The process of making acetates having more than two carbon atoms which consists in reacting on olefins having more than two carbon atoms with sulfuric acid, and reacting on the combination so produced with an agent adapted for replacing the sulfuric acid radical with the acetic acid radical.

5. The process of making esters which consists in reacting with sulfuric acid on olefins, in incorporating the reaction product with an agent adapted for replacing the sulfuric acid radical with an organic acid radical, and distilling.

6. The process of making acetates which consists in reacting with sulfuric acid on olefins, in incorporating the reaction product with an agent adapted for replacing the sulfuric acid radical with the acetic acid radical, and distilling at substantially atmospheric pressure.

7. The process of making esters which comprises reacting on sulfated olefin material with an agent adapted for replacing the sulfuric acid radical with an organic acid radical.

8. The process of making acetates which consists in reacting on sulfated olefin material with a salt of acetic acid at substantially atmospheric pressure.

9. The process of making acetates which comprises reacting on sulfated olefin material with calcium acetate.

10. The process of making acetates which comprises treating hydrocarbon material comprising unsaturated material with sulfuric acid, whereby sulfated derivatives of unsaturated hydrocarbons are produced, and in reacting thereon with calcium acetate.

11. The process of making esters which consists in reacting on olefins, when admixed with liquid saturated hydrocarbons, with sulfuric acid under sulfating conditions, separating out the acid liquor so formed, and reacting thereon with an agent adapted for replacing the sulfuric acid radical with an organic acid radical.

12. The process of making acetates which consists in reacting on olefins, when admixed with liquid saturated hydrocarbons, with sulfuric acid under sulfating conditions, separating out the acid liquor so formed, and reacting thereon with an agent adapted for replacing the sulfuric acid radical with the acetic acid radical.

13. The process of making acetates which consists in reacting on olefins, when admixed with liquid saturated hydrocarbons, with sulfuric acid under sulfating conditions, separating out the acid liquor so produced, incorporating such acid liquor with calcium acetate, and distilling.

14. The process of making acetates which consists in reacting with sulfuric acid, under sulfating conditions, on olefin hydrocarbons when admixed with liquid saturated hydrocarbons, separating out the acid liquor so produced, mixing calcium acetate with the acid liquor, digesting the mixture, distilling at substantially atmospheric pressure, and separating the acetates produced from accompanying aqueous material.

15. The process of making acetates which consists in reacting with sulfuric acid, under sulfating conditions, on olefin hydrocarbons when admixed with liquid saturated hydrocarbons, separating out the acid liquor so produced, mixing calcium acetate with the acid liquor, digesting the mixture, distilling at substantially atmospheric pressure, adding water as the distillation proceeds, and separating the acetates produced from accompanying aqueous material.

16. The process of extracting olefins from cracked oils with sulfuric acid, distilling the acid extract with calcium acetate, and treating the distillate with lime whereby calcium acetate is reformed.

17. The process of making acetates which consists in reacting with sulfuric acid on olefins, diluting the olefin-acid combination, adding calcium acetate, and distilling.

In testimony that we claim the foregoing, we hereto set our hands, this 23rd day of June, 1917.

CARLETON ELLIS.
MORTIMER J. COHEN.